US009946455B2

(12) United States Patent
Hlad et al.

(10) Patent No.: US 9,946,455 B2
(45) Date of Patent: Apr. 17, 2018

(54) SYSTEM AND METHOD FOR MANAGING AND DISPLAYING SECURITIES MARKET INFORMATION

(71) Applicant: New York Stock Exchange LLC, New York, NY (US)

(72) Inventors: Robert B. Hlad, Redding, CT (US); Valerie Jeanne Schafer, Huntington Station, NY (US); Cynthia Teresa Bautista-Rozenberg, Jersey City, NJ (US); Robert S. Tannen, Philadelphia, PA (US); Nicholas L. Springer, Crosswicks, NJ (US)

(73) Assignee: New York Stock Exchange LLC, New York, NY (US)

( * ) Notice: Subject to any disclaimer, the term of this patent is extended or adjusted under 35 U.S.C. 154(b) by 268 days.

(21) Appl. No.: 14/718,714

(22) Filed: May 21, 2015

(65) Prior Publication Data

US 2015/0253983 A1    Sep. 10, 2015

Related U.S. Application Data

(63) Continuation of application No. 11/399,938, filed on Apr. 7, 2006, now Pat. No. 9,043,719.

(Continued)

(51) Int. Cl.
*G06F 3/00*          (2006.01)
*G06F 3/0488*     (2013.01)

(Continued)

(52) U.S. Cl.
CPC ........ *G06F 3/04883* (2013.01); *G06F 3/0482* (2013.01); *G06F 3/04842* (2013.01);
(Continued)

(58) Field of Classification Search
CPC .... G06Q 10/107; G06Q 40/00; G06F 17/211; G06F 17/248; G06F 3/04883; G06F 3/0482; G06F 3/04842; H04L 12/58
(Continued)

(56) References Cited

U.S. PATENT DOCUMENTS 5,267,327 A * 11/1993 Hirayama .......... G06K 9/00436
382/161
5,715,415 A   2/1998 Dazey et al.
(Continued)

OTHER PUBLICATIONS

Microsoft Outlook 2003 SP2, Part of Microsoft Office Professional Edition 2013, Copyright 1995-2003 Microsoft Corporation.
(Continued)

*Primary Examiner* — Nicholas Augustine
(74) *Attorney, Agent, or Firm* — DLA Piper LLP (US)

(57) ABSTRACT

A message screen display comprises a static non-scrollable display area for display of at least part of a first message, the first message having an associated first message time. The message screen display further comprises a scrollable display area for display of at least part of a second message, the second message having an associated second message time. The message screen display further comprises a feature applied to at least part of the first message that varies based on time as referenced to the associated first message time.

9 Claims, 29 Drawing Sheets

Related U.S. Application Data

(60) Provisional application No. 60/675,276, filed on Apr. 27, 2005, provisional application No. 60/669,485, filed on Apr. 8, 2005, provisional application No. 60/669,567, filed on Apr. 8, 2005, provisional application No. 60/669,568, filed on Apr. 8, 2005.

(51) Int. Cl.
*G06Q 40/00* (2012.01)
*G06F 3/0482* (2013.01)
*G06F 3/0484* (2013.01)
*H04L 12/58* (2006.01)

(52) U.S. Cl.
CPC ............ *G06Q 40/00* (2013.01); *H04L 51/16* (2013.01); *H04L 51/22* (2013.01)

(58) Field of Classification Search
USPC ........................................................ 715/752
See application file for complete search history.

(56) References Cited

U.S. PATENT DOCUMENTS

| | | | |
|---|---|---|---|
| 6,727,916 B1 | 4/2004 | Ballard | |
| 6,779,178 B1* | 8/2004 | Lloyd | G06F 17/21 |
| | | | 707/999.01 |
| 7,076,730 B1 | 7/2006 | Baker | |
| 8,073,895 B2* | 12/2011 | Hamzeh | G06F 9/44526 |
| | | | 709/200 |
| 2003/0237043 A1 | 12/2003 | Novak et al. | |
| 2004/0008222 A1* | 1/2004 | Hovatter | G06F 3/0481 |
| | | | 715/749 |
| 2004/0117831 A1* | 6/2004 | Ellis | H04N 5/44543 |
| | | | 725/53 |
| 2004/0181586 A1* | 9/2004 | Morreale | H04L 12/58 |
| | | | 709/206 |
| 2004/0220829 A1* | 11/2004 | Baharav | G05F 1/14 |
| | | | 705/2 |
| 2005/0132298 A1 | 6/2005 | Lueckhoff et al. | |
| 2005/0213174 A1* | 9/2005 | Maki | H04N 1/00143 |
| | | | 358/540 |
| 2006/0168509 A1 | 7/2006 | Boss et al. | |
| 2006/0184886 A1 | 8/2006 | Chung et al. | |
| 2006/0187477 A1 | 8/2006 | Maki et al. | |
| 2006/0265453 A1* | 11/2006 | Kaminsky | G06Q 10/107 |
| | | | 709/206 |
| 2007/0106729 A1 | 5/2007 | Adams et al. | |
| 2007/0156886 A1 | 7/2007 | Srivastava | |
| 2007/0227537 A1* | 10/2007 | Bemister | A61M 16/00 |
| | | | 128/200.24 |
| 2007/0250769 A1 | 10/2007 | Bass et al. | |
| 2007/0250783 A1 | 10/2007 | Wu et al. | |
| 2008/0064363 A1* | 3/2008 | Salafia | H04M 3/42068 |
| | | | 455/404.1 |
| 2008/0109472 A1* | 5/2008 | Underwood | G06F 17/3089 |
| 2009/0265453 A1* | 10/2009 | Hirano | H04L 12/24 |
| | | | 709/223 |
| 2010/0115559 A1* | 5/2010 | Ellis | H04N 5/44543 |
| | | | 725/53 |
| 2010/0261492 A1* | 10/2010 | Salafia | H04M 3/42068 |
| | | | 455/466 |

OTHER PUBLICATIONS

Microsoft Office Outlook 2003 Basic Guide SP2, Part of Microsoft Office Professional Edition 2003, Copyright 1995-2003 Microsoft Corporation, pp. 1-31, Dec. 27, 2005.
Market Access Subcommittee Interim Report, Nov. 27, 2001.
Best Practices for Organized Electronic Markets, Apr. 24, 2002.
A Taxonomy of Automated Trade Execution Systems, Ian Domowitz, Journal of International Money and Finance, (1993), 12, pp. 607-631.

\* cited by examiner

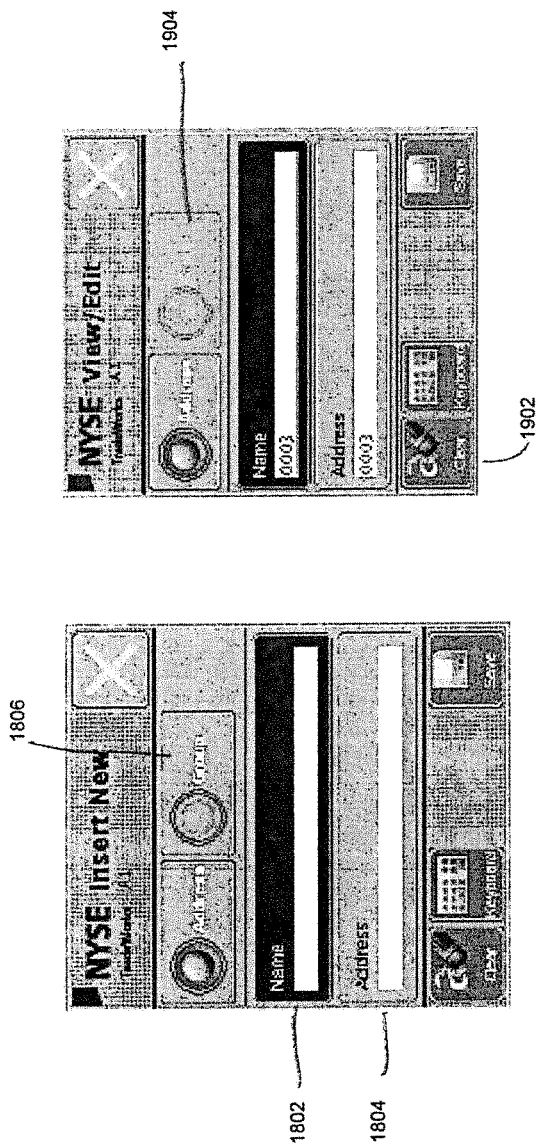
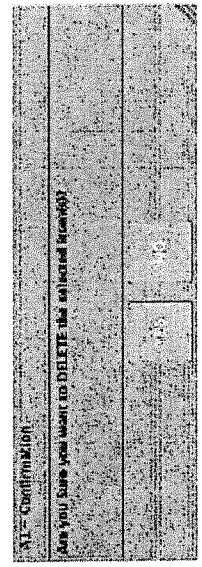
FIG. 19
FIG. 18
FIG. 20

SYSTEM AND METHOD FOR MANAGING AND DISPLAYING SECURITIES MARKET INFORMATION

BACKGROUND

Systems and methods are known for message display and management. Systems and methods are needed that support images and text and allow users to interface without a requirement for traditional keyboard access.

The preceding description is not to be construed as an admission that any of the description is prior art relative to the present invention.

SUMMARY OF THE INVENTION

In one aspect, the embodiments provide a message screen display. The message screen display comprises a static non-scrollable display area for display of at least part of a first message, the first message having an associated first message time. The message screen display further comprises a scrollable display area for display of at least part of a second message, the second message having an associated second message time. The message screen display further comprises a feature applied to at least part of the first message that varies based on time as referenced to the associated first message time.

In other aspects, the feature applied to at least part of the first message is a color. In other aspects the feature indicates whether the first message has been viewed. In other aspects, the feature applied to at least part of the first message is a border. In other aspects, the border feature is a color. In other aspects, the scrollable display area further comprises a time-ordered display area for display of a plurality of messages arranged according to a time associated with each of the plurality of messages. In other aspects, the second message is one of the plurality of messages. In other aspects, the time associated with each of the plurality of messages is before the time associated with the first message. In other aspects, the time associated with the second message is before the time associated with the first message. In other aspects, the associated first message time is a time of message receipt. In other aspects, the associated first message time is a time of message transmission.

In one aspect, the embodiments provide a message template on a message screen display. The message template comprises a message subject fly-out window that includes user configurable and user selectable message subject text templates, and a message recipient fly-out window that includes user configurable and user selectable message recipient text templates. The message template further comprises a message body fly-out window that includes user configurable and user selectable message body text templates and user configurable and user selectable message body graphic templates.

In one aspect, the embodiments provide a system and method for message display on a message screen display. The system and method comprise applying a feature to at least part of a second message that varies based on time as referenced to a time associated with the second message, and displaying at least part of the second message within a static non-scrollable display area. The system and method further comprise receiving a first message, and moving the second message from the static non-scrollable display area to a scrollable display area. The system and method further comprise applying a feature to at least part of the first message that varies based on time as referenced to a time associated with the first message, and displaying at least part of the first message within the static non-scrollable display area.

In other aspects, moving the second message from the static non-scrollable display area to the scrollable display area is responsive to receiving the first message. In other aspects, the system and method further comprise changing the feature applied to at least part of the first message. In other aspects, the system and method further comprise changing the feature applied to at least part of the second message.

The foregoing specific aspects are illustrative of those which can be achieved and are not intended to be exhaustive or limiting of the possible advantages that can be realized. Thus, the objects and advantages will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein:

FIGS. 2-36 illustrate screenshots according to various embodiments; and

Figure 1:
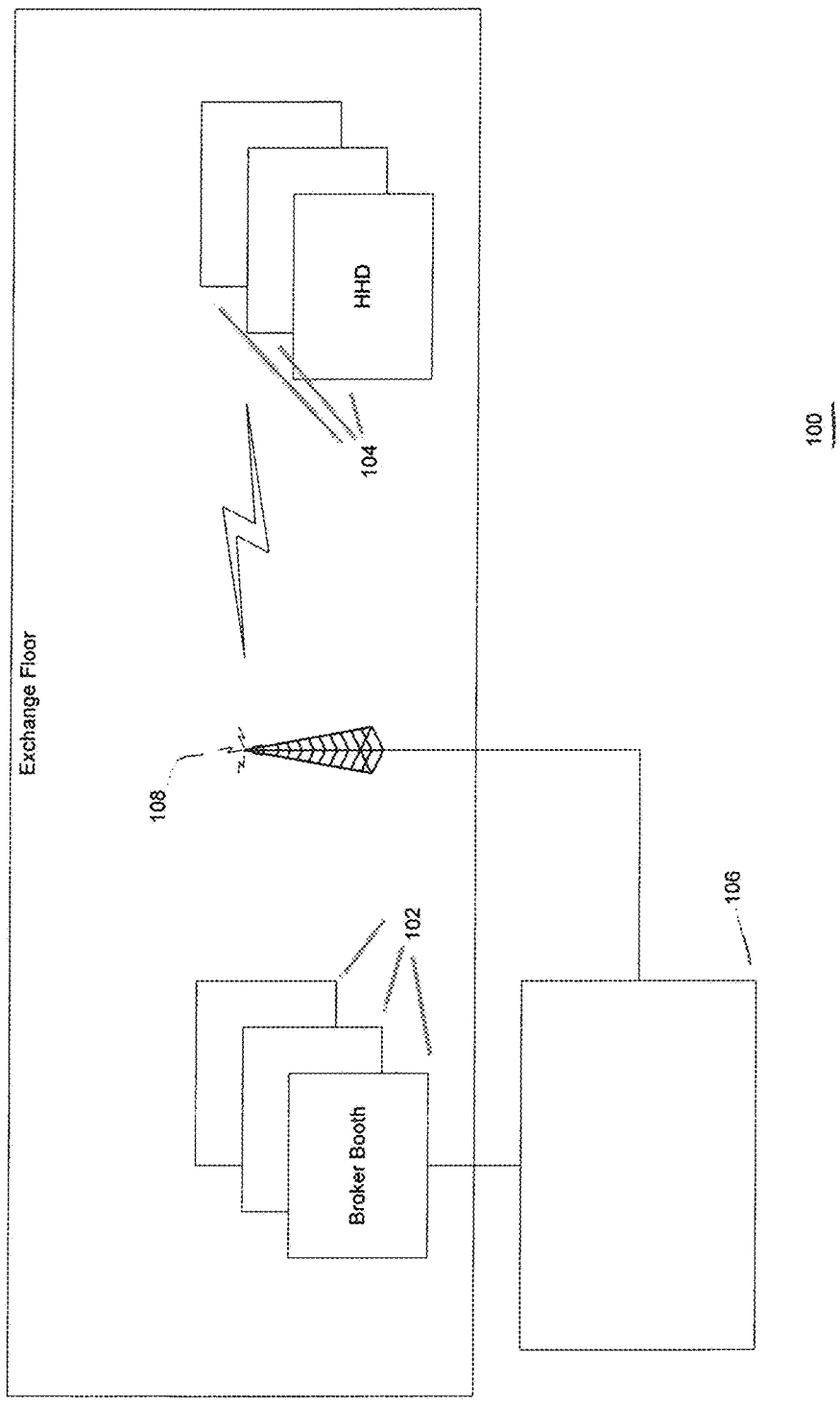
FIG. 1 illustrates an example system according to an embodiment.

It is understood that the drawings are for illustration only and are not limiting.

DETAILED DESCRIPTION OF THE DRAWINGS

Electronic messaging systems and applications have been used for a number of years in many different industries and sectors. Some of those messaging applications rely entirely on text or graphics, and others use a mixture of text and graphics.

Today, the securities and finance industry makes extensive use of electronic messaging, and open outcry trading is one area in that industry where electronic messaging is particularly important. In open outcry trading, individuals gather in a common location to trade financial instruments, such as stocks, bonds, commodity contracts, option contracts, futures contracts, etc. There are a number of open outcry markets, and each generally specializes in particular types of instruments. Some of the most well known open outcry markets in the United States include NYSE, AMEX, CBOT, CME and CBOE.

In a simple example of an open outcry market, a customer order to buy or sell a particular financial instrument (e.g., shares of stock or commodity contracts) is sent to an individual located on the trading floor (e.g., a floor broker or floor trader). The broker or trader goes to a location on the trading floor (e.g., a post or pit) where other brokers or traders gather to trade that instrument and verbally announces terms of the order. If the order terms are acceptable, then another broker or trader in the crowd takes the opposite side of the order and completes the trade. In most open outcry markets floor brokers move freely around the trading floor, trading different instruments for different customers at different locations. Because the floor broker is not always at the same place, getting a customer order to the floor brokers in an open outcry market presents a challenge.

Today, many open outcry markets use wireless electronic communications to send customer orders to the floor brokers. However, before the development of wireless electronic communications, brokers in some markets (e.g., the NYSE) relied heavily on runners to physically take a slip of paper with the order details from a booth on the perimeter of the floor to the broker. At times, the floor broker wanted to tell customers about the market (e.g., market information) and relied on the same runners to take slips of paper with that market information back to the booth where it could be sent to the customers. The floor brokers developed a group of standardized and efficient ways to write and communicate market information on a slip of paper. Although many current electronic communication systems use keyboards for entry of text, in the trading industry, the legacy techniques continue even with electronic devices, and rely on handwritten information contained within images, often referred to as "ink." This continued use of hand-written information is partly because the broker is standing and holds everything in her hands or pockets. To communicate with her booth on the edge of the trading floor, the broker can write or jot notes on a pad, a slip of paper, or a hand-held device. However, typing on a keyboard with two hands is almost impossible because there is nothing to support the device. The embodiments described have particular application in a trading environment, where at least one of the parties to the communication relies on handwriting or a touch-screen input to communicate, and graphics or images are an integral part of the communication.

An Example System

In FIG. 1, an example system 100 includes a plurality of broker booths 102 located on or in the vicinity of an exchange trading floor. The broker booths communicate electronically with a plurality of broker hand-held devices (HHDs) 104. The electronic communication between the broker booths and the broker HHDs is generally wireless, and makes use of various servers and computers 106 that may be located on the exchange floor, as well as off the exchange floor. Wireless communication with the HHDs also makes use of communication antenna 108.

Although not illustrated in FIG. 1, the broker booths 102, HHDs 104, servers and computers 106 all include general purpose or special purpose computers that have central processors (CPUs), memory (RAM, ROM, EPROM, FLASH, etc.), fixed and removable code and data storage devices (floppy drives, hard drives, CD and DVD drives, flash memory cards, etc.), input/output devices (keyboards, displays, printers, pointing devices, etc.), and network devices (wired and wireless network interface devices and cards, modems etc.). The devices communicate over wired and wireless networks (Ethernet, WiFi, PSTN, etc.). Software used to operate system 100 may be downloaded or transmitted as an information signal for storage on system 100 or operation of system 100.

Figure 2:
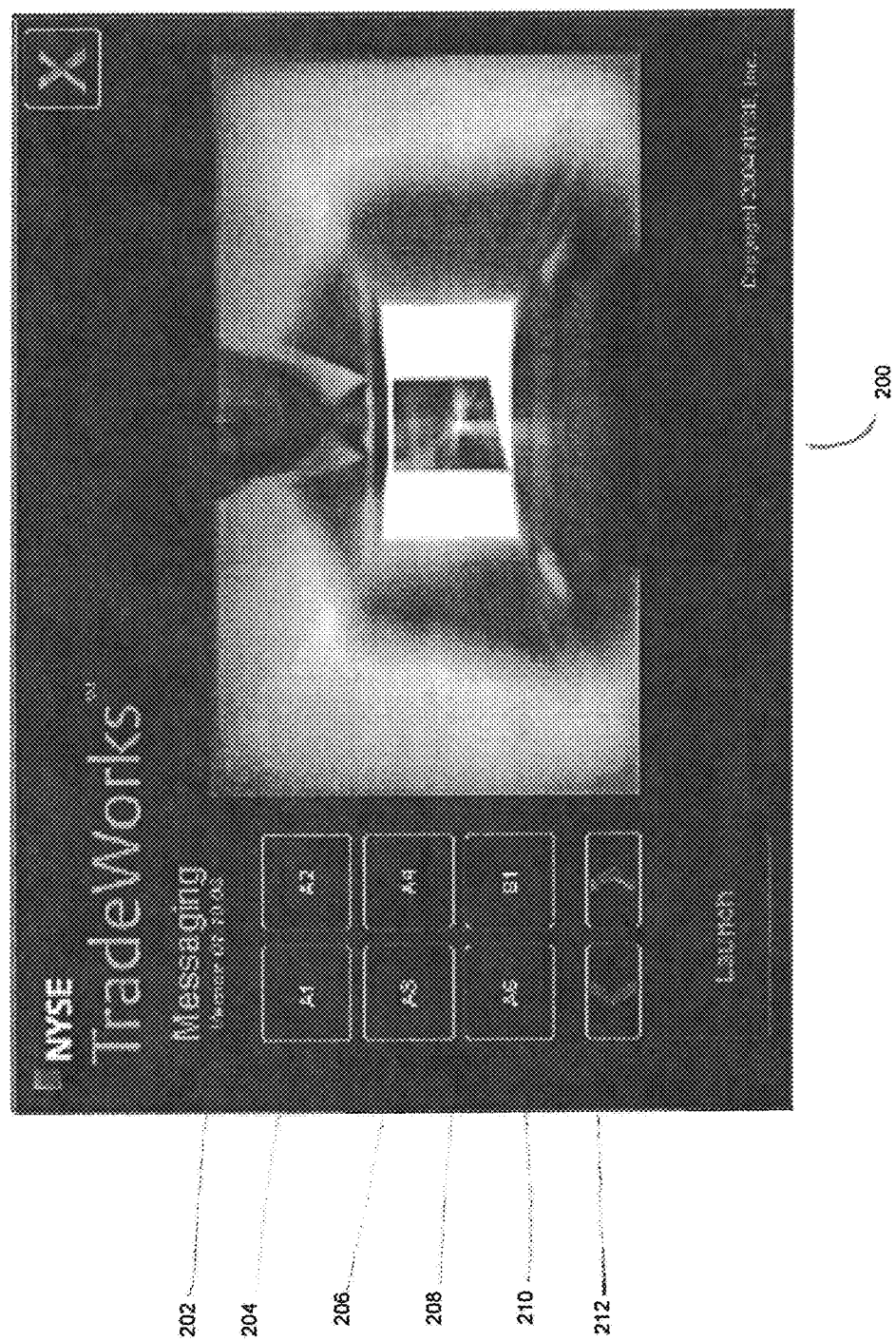

Referring to FIG. 2, when users first access system 100, they are presented with a splash screen or log-in screen 200. On the log-in screen, the user can select a particular agency 202, or multiple agencies (202-212). By selecting multiple agencies, the user can then use a single terminal display to support multiple agencies.

Figure 3:
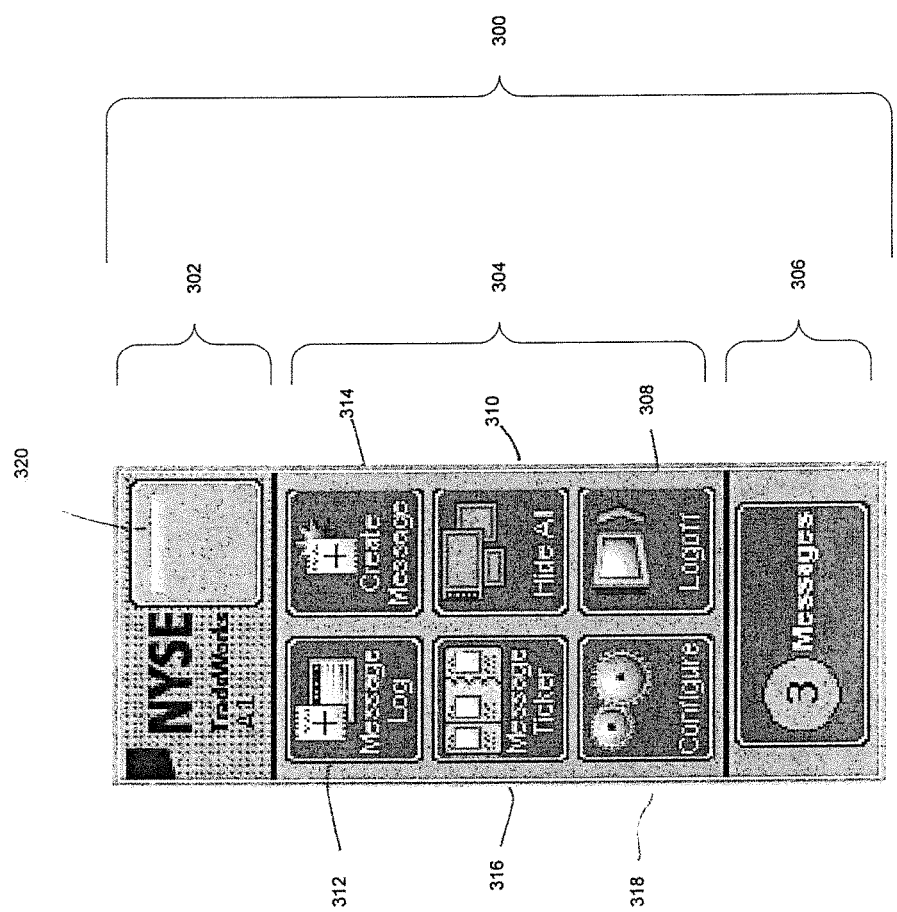

Referring to FIG. 3, once the user has logged-in, an application toolbar 300 is displayed. This is the main control area for the application and has three sections: a title bar 302; action buttons 304; and a message indicator 306. The title bar 302 shows the logical address or agency that is being used, which is A1 in the example. The action buttons 304 include a logoff button 308, a hide all/show all toggle button 310, and launching buttons for the major messaging functions. The major messaging functions include Message Log 312, create a message 314, Message Ticker 316, and configure 318. The message alert button 306 alerts the user to the number of new (unacknowledged) incoming messages in the list. In the example, there are three new unacknowledged incoming messages.

Figure 4:
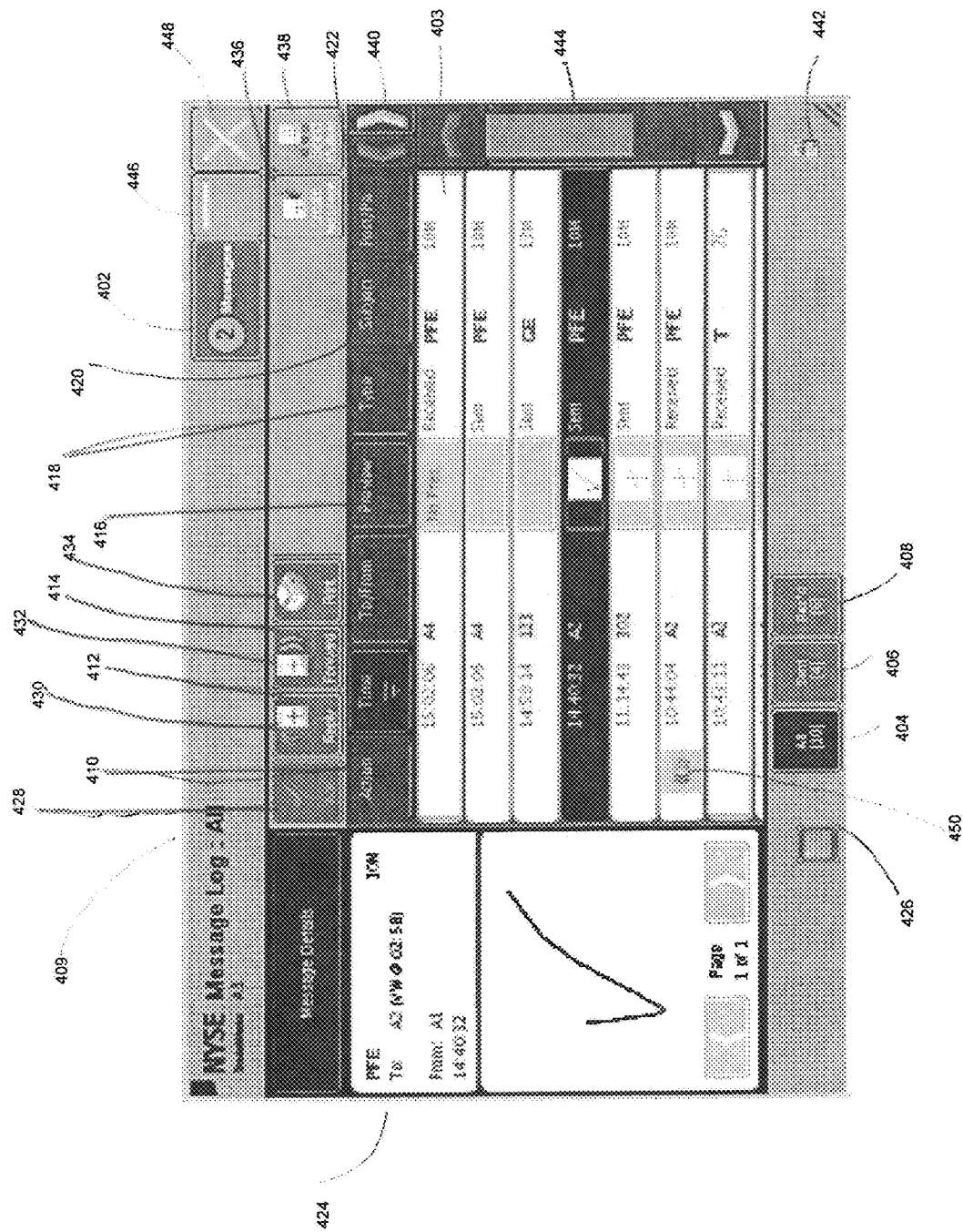

If the user selects the Message Log button 312, they are presented with a Message Log window. An example Message Log window is illustrated in FIG. 4. The Message Log window provides the user with a list of messages that were sent and/or received. The number of unread messages is indicated in the message alert counter 402, and any unread messages are identified on the Message Log window by a highlighted colored border, such as bright orange. An example unread message 403 has such an orange border. The user can select the messages that are displayed on the Message Log by selecting the buttons for all messages 404, sent messages 406 or received messages 408. Displayed within the all, sent and received buttons, there is a indicator of the number of messages in each category.

There is an indicator 409 at the top of the Message Log to show whether all messages, sent messages, or received messages are being displayed. The example Message Log window in FIG. 4 displays all messages.

On the Message Log window, any actions taken for the message are indicated in the action column 410. If there is a reply to the message, a left chevron is emphasized. If the message was forwarded, a right chevron is emphasized, and if the message was both forwarded and replied to, the both the right and left chevrons are emphasized. In the example a message that was received from A2 at 10:44:04 with a subject of PFE has the right chevron emphasized to indicate that the message was forwarded.

The time column 412 shows the time the message was either sent or received. The to/from column 414 shows the destination or origin of the message. The preview column 416 shows a thumbnail of the message. The type column 418 indicates whether the message was received or sent. The subject column 420 indicates the subject of the message, and the post/panel column 422 indicates the post and panel of the stock that is the subject of the message.

In addition, the Message Log window can include a side panel 424, which is opened or closed with a side panel button 426. If open, the side panel shows message details of the selected message. The message details include the subject, post and panel, and who the message is to and from, with associated times. If the message was sent and has been viewed, then the side panel also includes the time the message was viewed (e.g., VW @ 02:58). If the message includes graphics or an image, then a larger view of the graphic is provided, and if the message includes multiple pages, that is indicated at the bottom of the side panel. The user can page forward or backward through the pages using the left and right arrows.

On the Message Log window, the user has buttons to acknowledge a message 428, reply to a message 430, forward a message 432, and print a message 434. The user also has buttons to create a message 436, and select multiple messages 438.

Figure 36:
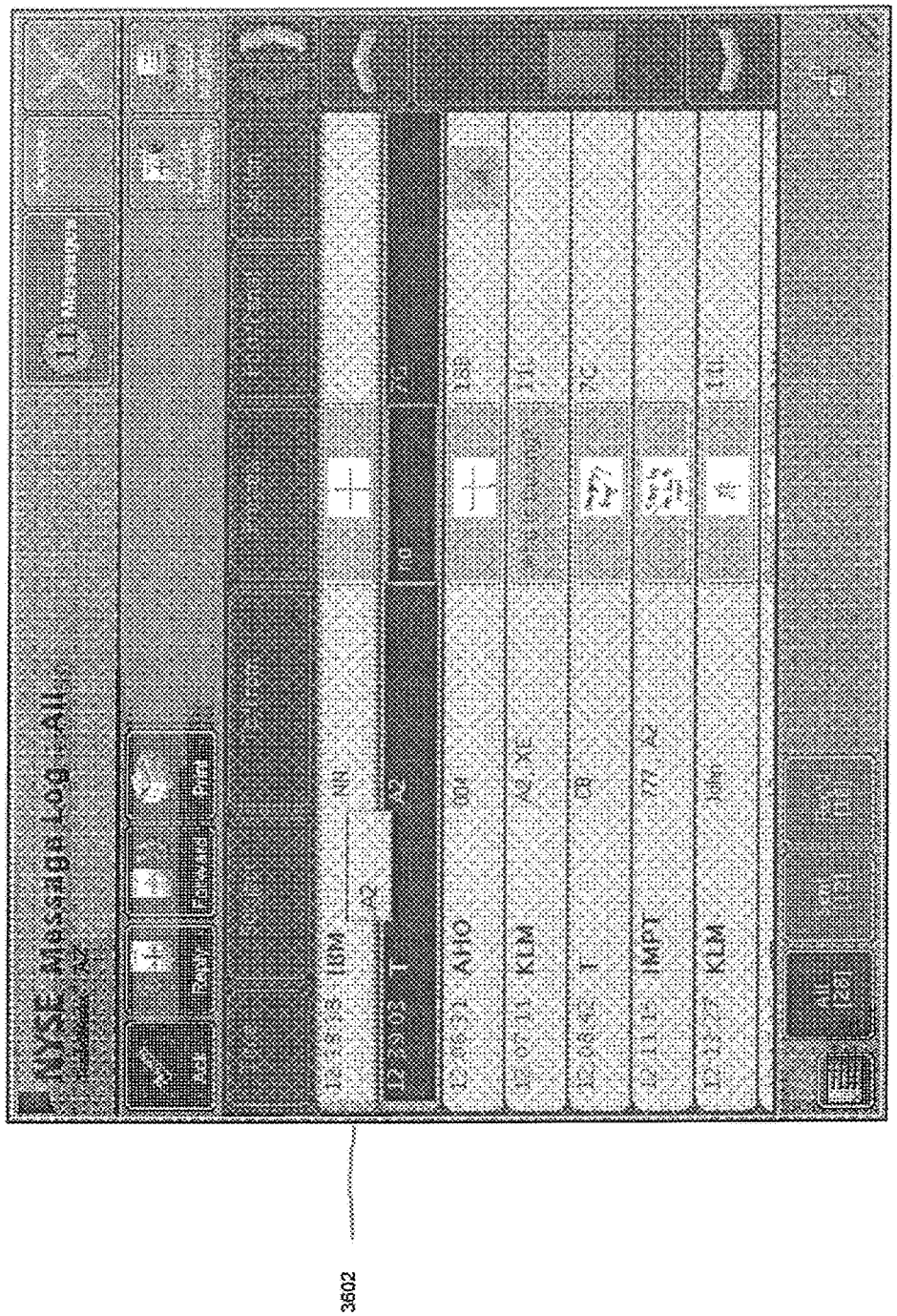

The user can adjust the order of columns on the Message Log window by dragging them, and can adjust the width of each column. If one of the columns is adjusted to a minimum width it is identified by " . . . ". The user can view the full column title using a "tooltip" by pressing and holding the column in question. An example tooltip is illustrated at 3602 in FIG. 36. This tooltip feature is available for other parts of the display as well. If the display does not fit within the window, arrows 440 allow the user to scroll the display left and right. The user can also lock the display 442 to keep a particular column order and presentation. Tapping a column allows the user to sort the messages by that column. One tap sorts by ascending order, two taps sorts by descending order and three taps is no sort. The user can sort messages when the display is locked. The user can also scroll the messages up and down with a slider bar or arrows 444.

On the Message Log window, messages sent to a broker handheld device or to another agency that are unviewed are indicated by being highlighted in a particular color, such as yellow. Undelivered messages are highlighted with a different color, such as red.

The size of the Message Log window can be adjusted by dragging the lower right corner. There is also a button to minimize the display 446, or close the Message Log window 448.

Figure 5:
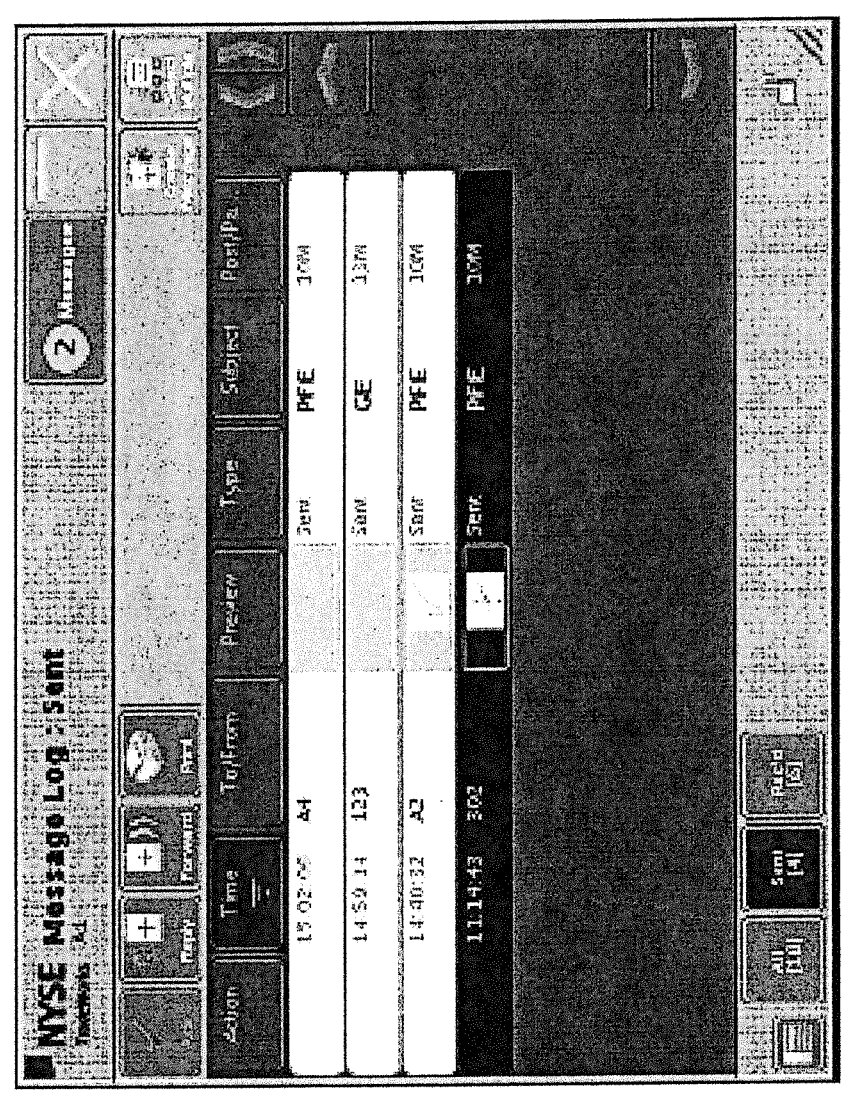
Figure 6:
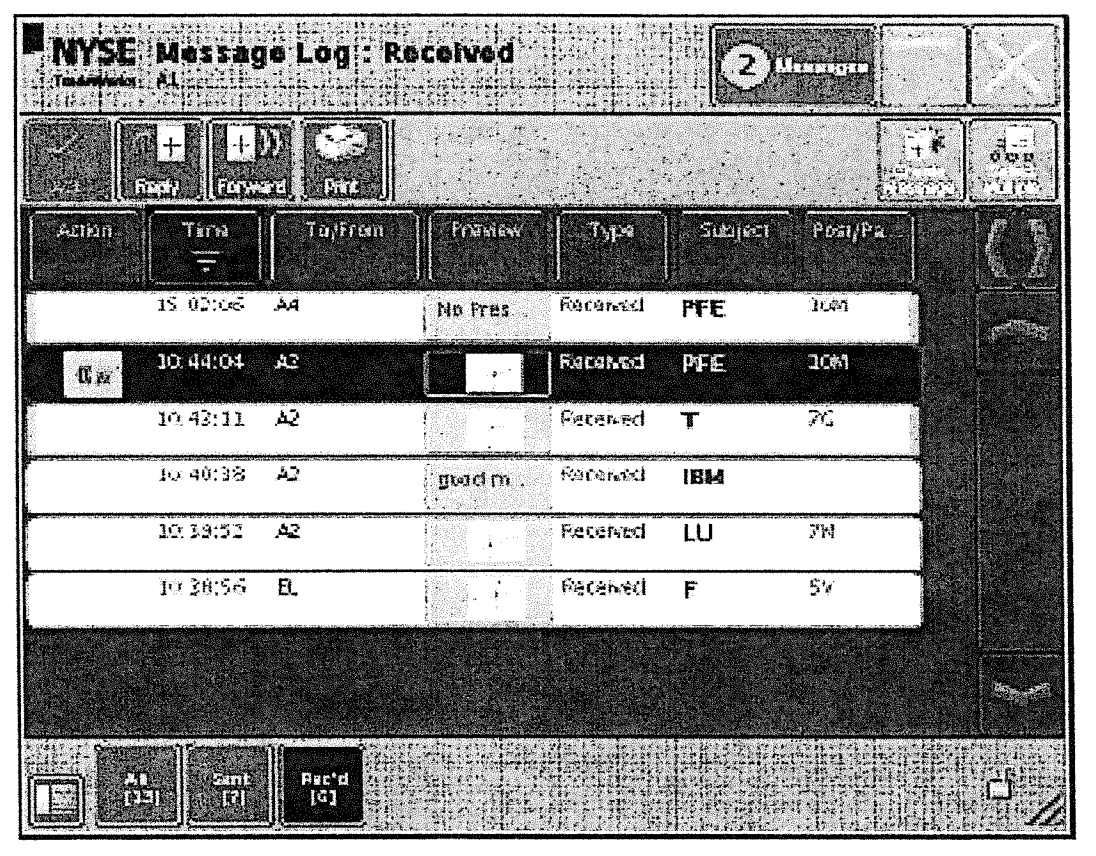

FIG. 5 illustrates an example Message Log window showing only sent messages, and without a side panel. FIG. 6 illustrates an example Message Log window showing only received messages.

Figure 7:
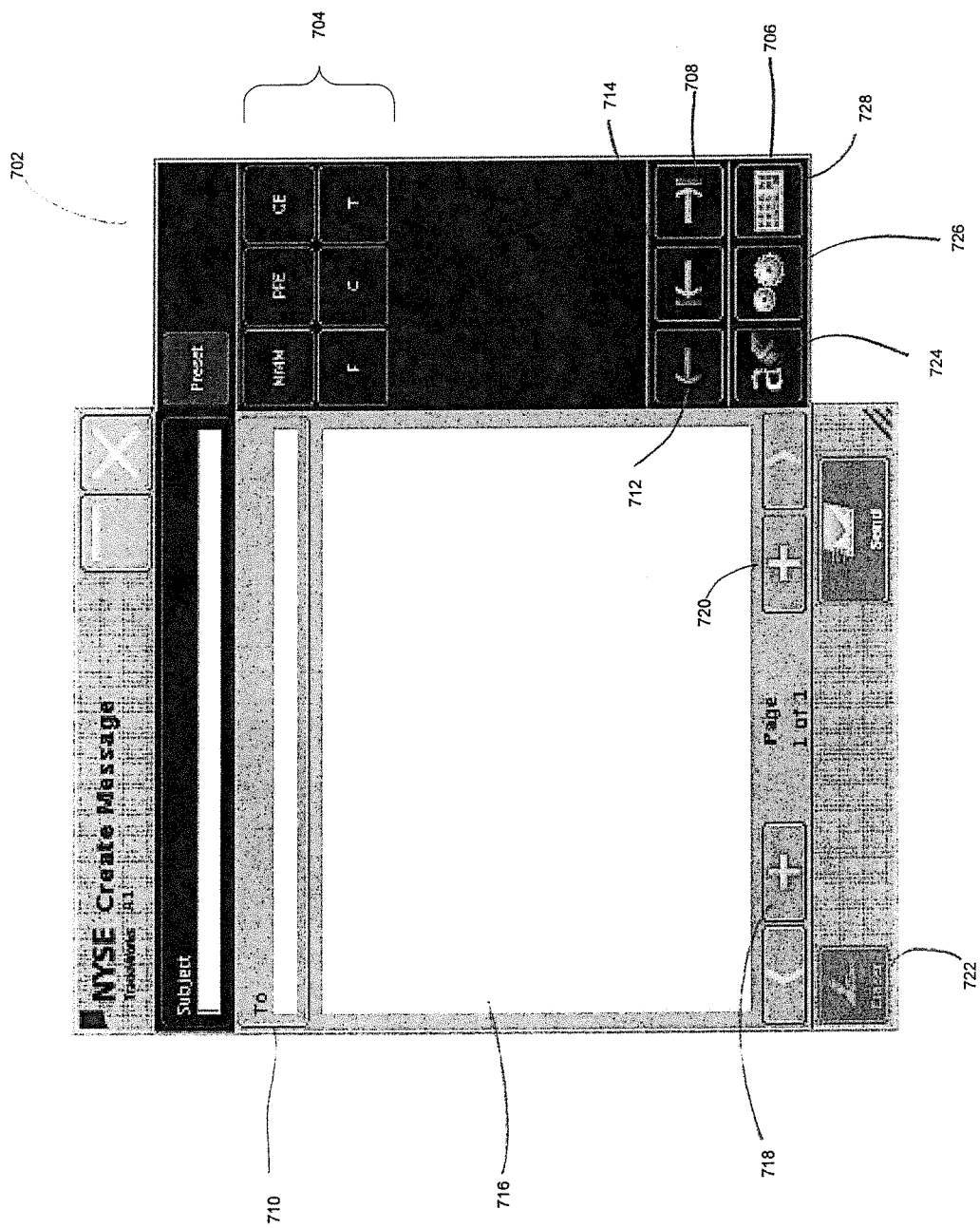

By selecting a Create Message button (e.g., 314 in FIG. 3), the user can create a new message using the Create Message window, which is illustrated in FIG. 7. The Create Message window includes a fly-out window 702 on the side. Initially, system 100 displays the subject fly-out window, which includes user-configurable and user-selectable Subjects 704. The user may select one of the preset Subjects by tapping or touching the Subject field. They can also enter a Subject using the keyboard, or by activating the on-screen keyboard 706. Once the user enters the message Subject, the user moves to the To field using the forward tab button 708, or taps the To field 710 and enters the address(es). As with the Subject, the user can enter the To address by selecting one of the preset addresses by tapping its associated button, or the user can enter the To field using the keyboard or activating the on-screen keyboard. If the user makes an error, they can tap the backspace button 712 to clear the entry. The user can also press the back-tab button 714 and return to the Subject field from the To field. The user moves from the To field to the Message field to enter the message as text or ink by pressing the forward tab button 708, or tapping the Message field 716. The user can select from preset text messages or ink messages by tapping the appropriate preset button in the fly-out window, or using the keyboard or on-screen keyboard. The Create Message window also includes buttons to insert a page before 718, or insert a page after 720. There is also a toggle button to erase or ink 722, and a button to clear or erase 724. Configure button 726 and on-screen keyboard button 728 will launch associated windows.

Figures 8, 9:
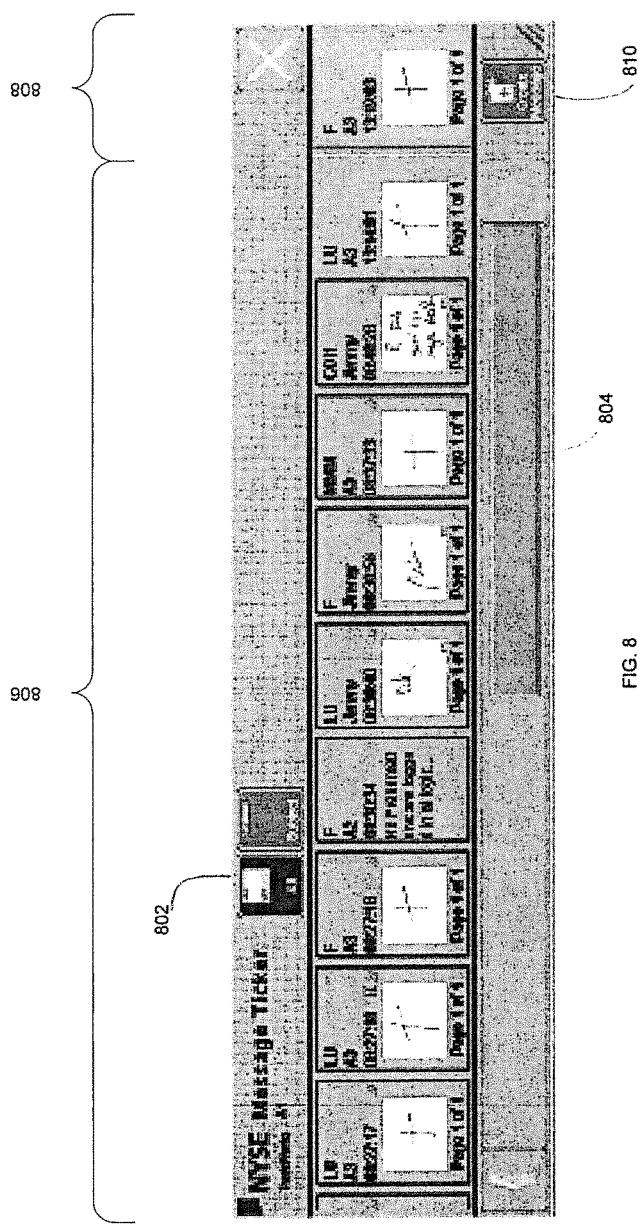

By selecting the Message Ticker button (e.g., 316 in FIG. 3), the user can also open a Message Ticker window, illustrated in FIGS. 8 and 9. In FIG. 8, thumbnail images of the incoming messages are provided, while in FIG. 9, only the subject of the incoming messages are provided. There are respective thumbnail all 802 and subject 902 buttons at the top of the Message Ticker. In the Message Ticker window, new incoming messages are displayed in a scrolling manner in a scrollable area 806 as they are received. The scroll bar 804 allows the user to scroll from the first received message at the left side to the next-to-last message received at the right side. The last or most recently received message is displayed in the non-scrolling area 808 located at the right side of the Message Ticker 806. When a message is received, it is first displayed in non-scrollable area 806 and remains in that non-scrollable area until a newer message is received. Then the newer message is displayed in the non-scrollable area and the older message is moved to the right side of the scrollable area. When a message is first received, the message background and border are highlighted in bright orange for 10 seconds. After the 10 second timer expires, the orange background highlight becomes light orange, and after 30 seconds if still unviewed, the message background changes to blue, with a bright orange highlight border. After the user views the message, all highlighting is removed and the message background and border are blue. If the user views the message, the background and border change from orange to blue is immediate, even if the 10 or 30 second timers have not expired. On the Message Ticker window there is a Create Message button 810 that performs the same functions as the Create Message button 314 in FIG. 3.

Figure 10:
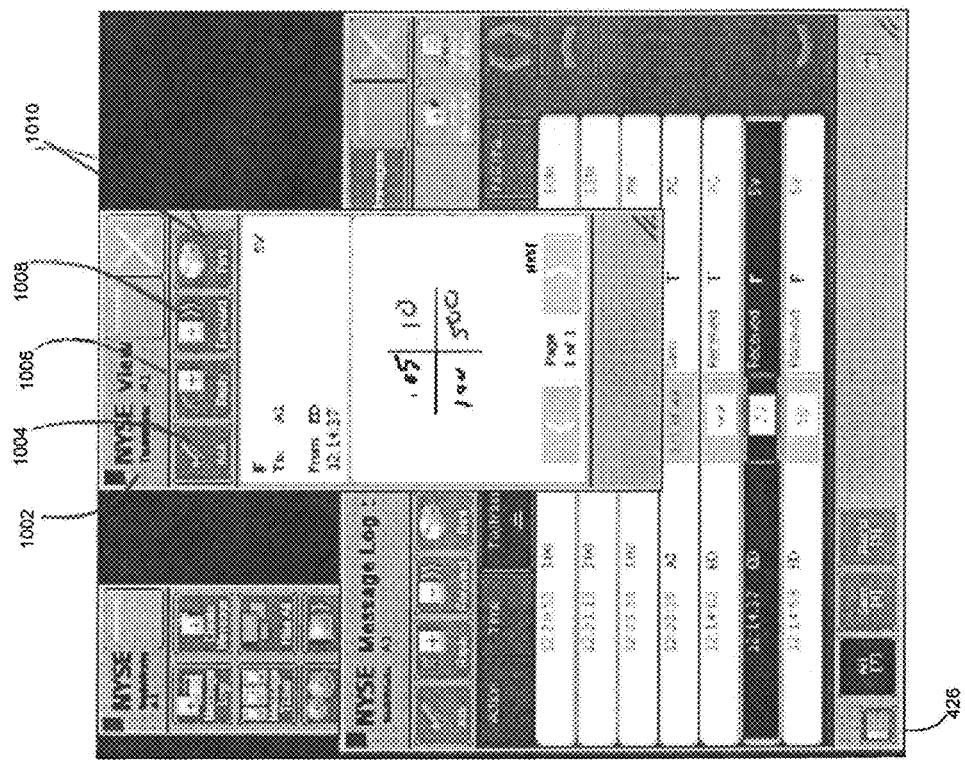

In FIG. 4, message details are displayed in side panel 424. It is also possible to show message details in a separate window, as illustrated in FIG. 10. In FIG. 10, the side panel is turned off by toggle button 426, and when the user taps in the preview column of the message they want to view, a View Message window 1002 opens. The user can independently drag or move the View Message window around the display, and can acknowledge 1004, reply 1006, forward 1008 or print the message 1010.

Figure 11:
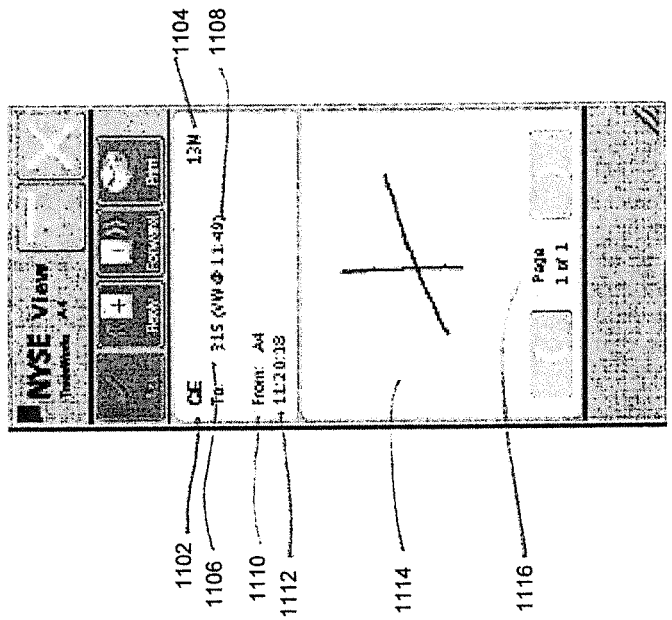

Referring to FIG. 11, the View Message window for a sent message contains the subject 1102 (GE in the example). It also contains the post and panel 1104 when the subject is a valid stock symbol (post and panel 13M in the example). The View Message window also contains the message destination 1106 (broker badge number 315 in the example), and the status and time the status changed 1108. Message status includes sent (SNT), failed to be delivered (FAIL), received (RCV) and viewed (VW). In the example the broker with badge number 315 viewed the message at 11:49. The View Message window also contains the origin 1110 (A4 in the example), and the time the message was sent 1112 (11:20:18 in the example). Finally, the View Message window contains the ink or text message 1114 and the page indicator 1116.

Figure 12:
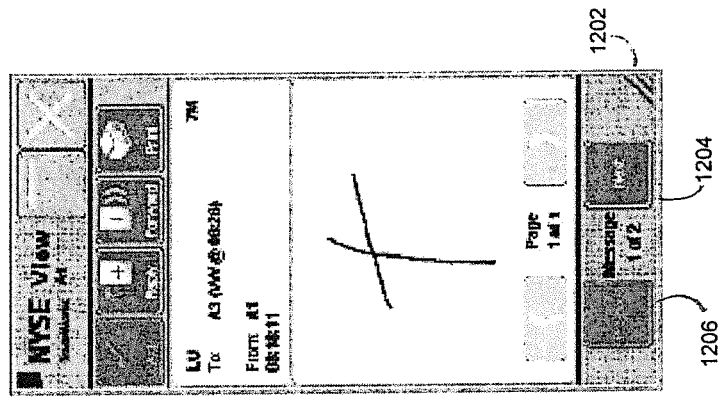

The user can also review all replied and forwarded messages associated with a message by using the action indicator buttons in the Message Log window (e.g., 450 in FIG. 4). Tapping the action indicator button opens a Message View window, such as illustrated in FIG. 12. Associated messages are identified at the bottom 1202 and the user can select next 1204 or previous 1206. The user can also open a Message View window from the Message Ticker window by double tapping the applicable message.

Figure 13:
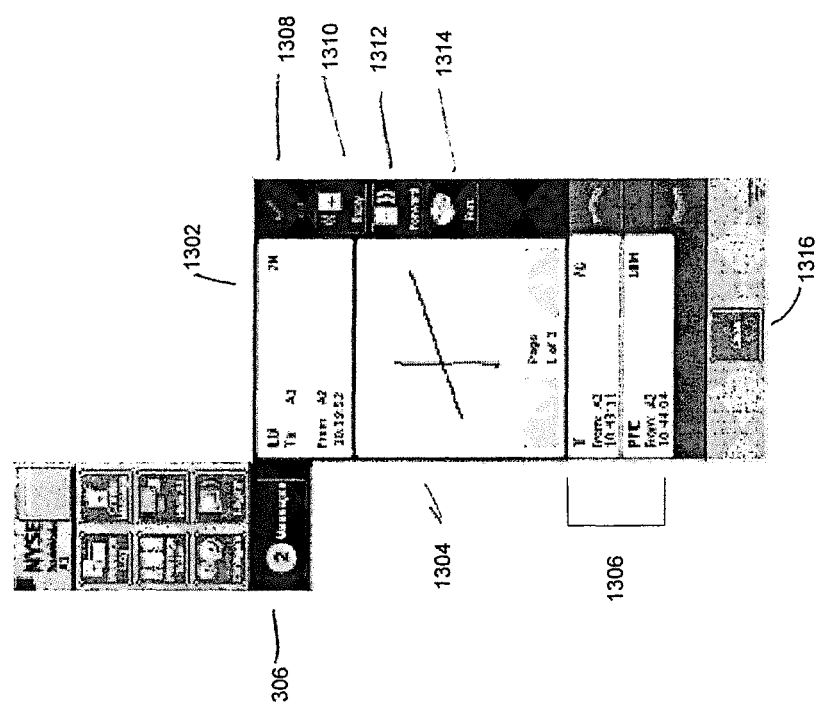

As illustrated in FIG. 13, a user can also view a list of all new messages and take action on them. Tapping on the message alert button 306 opens a View Message fly-out window 1302, which shows the latest unread message 1304 that was sent to the address. If there is more than one unread message, it is listed at the bottom of the window 1306. The user can acknowledge the message 1308, reply to the message 1310, forward the message 1312 and print the message 1314. The user can close the View Message fly-out window by tapping the close button 1316, or by tapping the message alert button 306. In the configuration options, the user can set manual acknowledgment on or off. If manual acknowledgment is off, then acknowledgement is sent automatically as soon as the user views the message, and the number of unread messages decrements automatically. If manual acknowledgment is on, the user must use the manual acknowledge button 1308.

Figure 14:
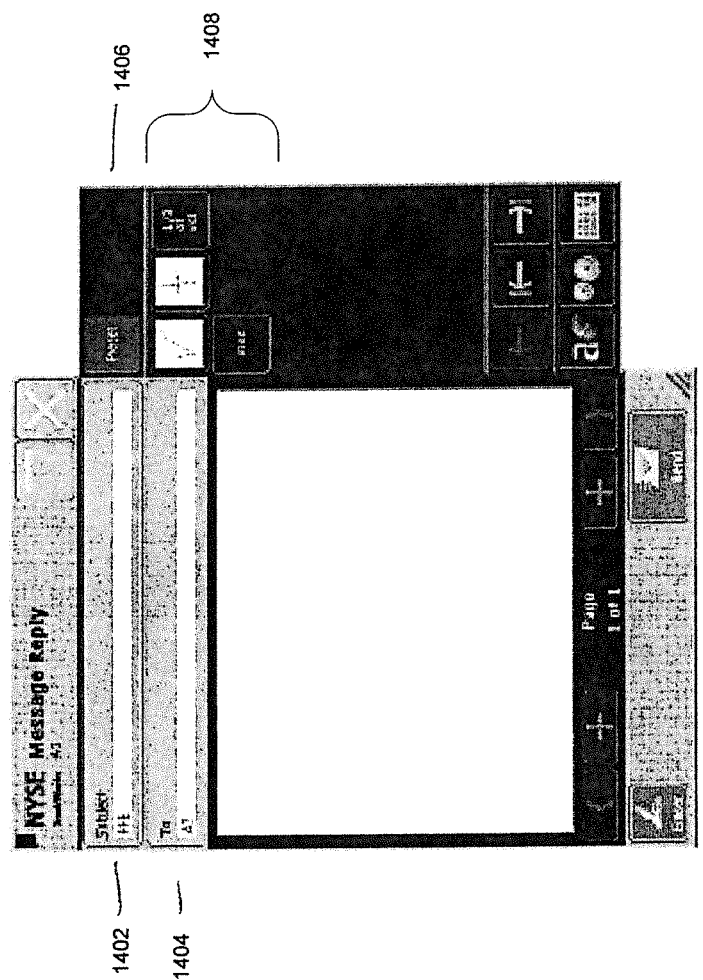

When a user presses a message reply button (e.g., 1006 in FIG. 10), a Message Reply window opens, as illustrated in FIG. 14. The Subject 1402 and To 1404 fields are automatically filled in, and the Message fly-out window 1406 is active. The user can select from a preset message 1408, or use the ink feature, the keyboard or the on-screen keyboard.

Figure 15:
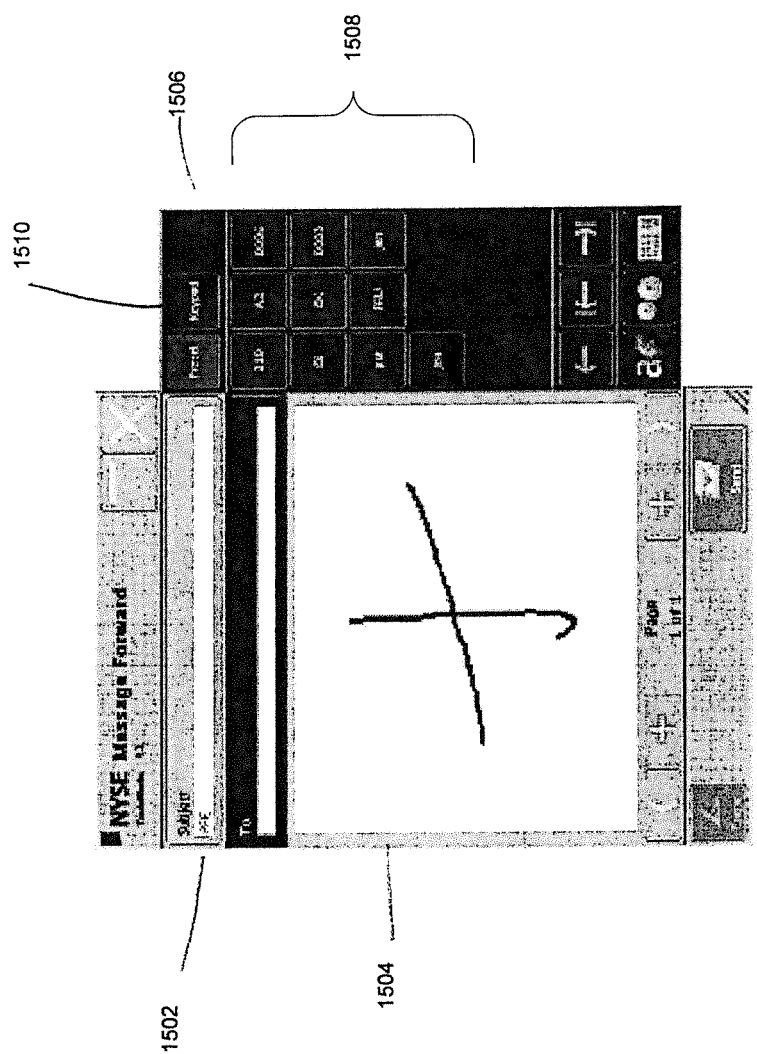

When a user presses a message forward button (e.g., 1008 in FIG. 10), a Message Forward window opens, as illustrated in FIG. 15. The Subject 1502 and Message content 1504 are already filled in, and the To field fly-out window 1506 is active. The user can select from preset addresses in the fly-out window 1508, or use the keypad 1510, keyboard, or on-screen keyboard.

Figure 16:
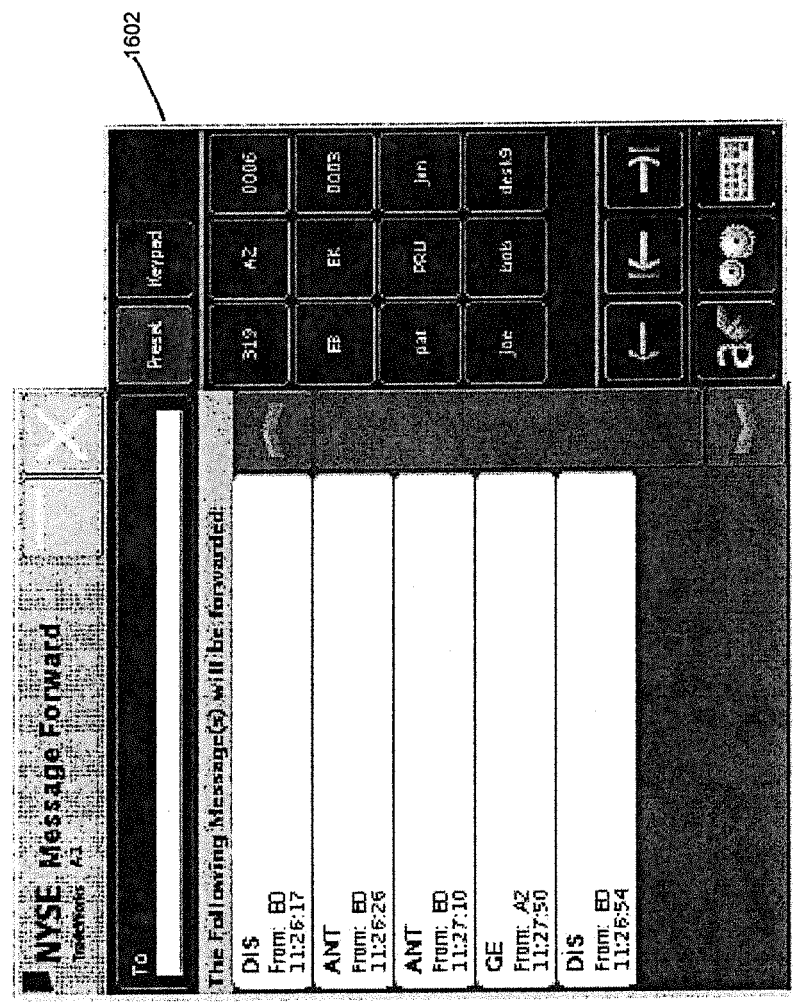

A user can forward multiple messages by tapping a select multiple button (e.g., 438 in FIG. 4) and then after selecting the desired messages, selecting the forward message button (e.g., 432 in FIG. 4). This will open a Forward Multiple Messages window, as illustrated in FIG. 16. The user can then select from the desired address(es) from preset addresses in the fly-out window 1602, or use the keypad, keyboard or on-screen keyboard.

Figure 17:
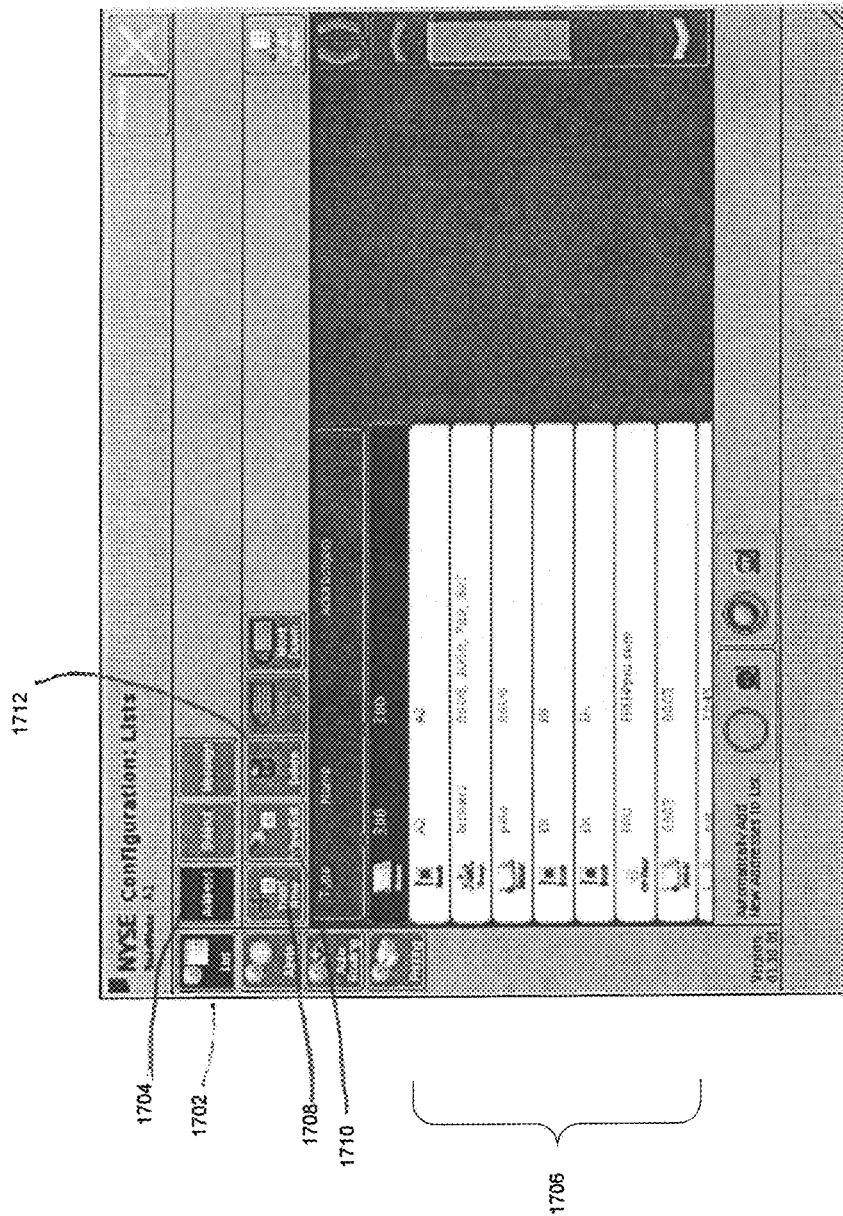

Tapping a configure button (e.g., 318 in FIG. 3), opens a Messaging Configuration window, as illustrated in FIG. 17. In the example the user has selected list 1702, and address 1704, and all existing addresses are displayed 1706. To enter a new address, the user selects the new address button 1708, which opens an Insert New window, as illustrated in FIG. 18. The cursor starts in the Name field 1802, and includes an Address field 1804 where the user can enter a booth address, broker badge number or e-mail address.

To edit an existing address, the user selects the address they want to view or edit and then the view/edit button (e.g., 1710 in FIG. 17), which opens a View/Edit window, as illustrated in FIG. 19. The user can use the clear button 1902 to clear a field and the keyboard to enter new information.

To delete an existing address, the user selects the address they want to delete and then the delete button (e.g., 1712 in FIG. 17), which opens a confirmation window, as illustrated in FIG. 20.

Figure 21:
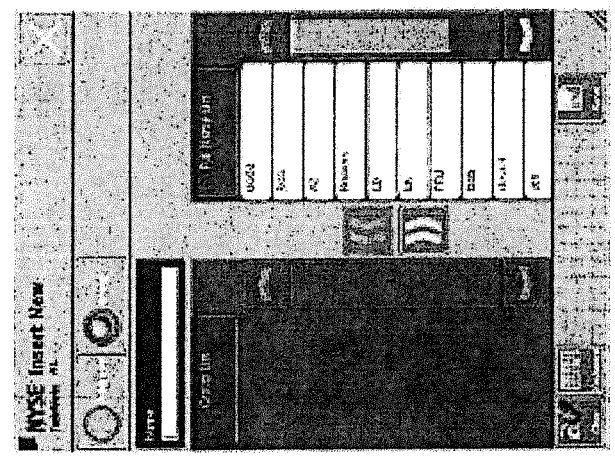

The user can also create and edit groups. To create a group, the user selects the group button 1806 in FIG. 18. This opens an Insert New Group window, as illustrated in FIG. 21. The user enters a group or list name 2102, and can then select the applicable addresses to add to the group or list.

Figure 22:
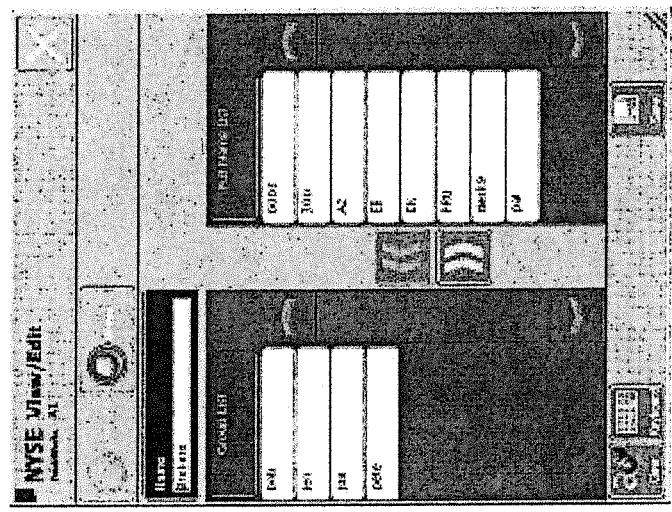

To edit a group, the user selects the group button 1904 in FIG. 19. This opens a View/Edit Group window as illustrated in FIG. 22. From this window the user can select the group or list and then add or remove addresses.

Figure 24:
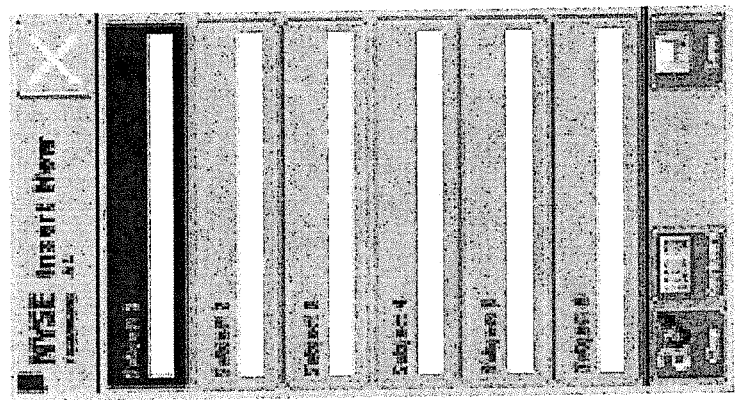
Figure 23:
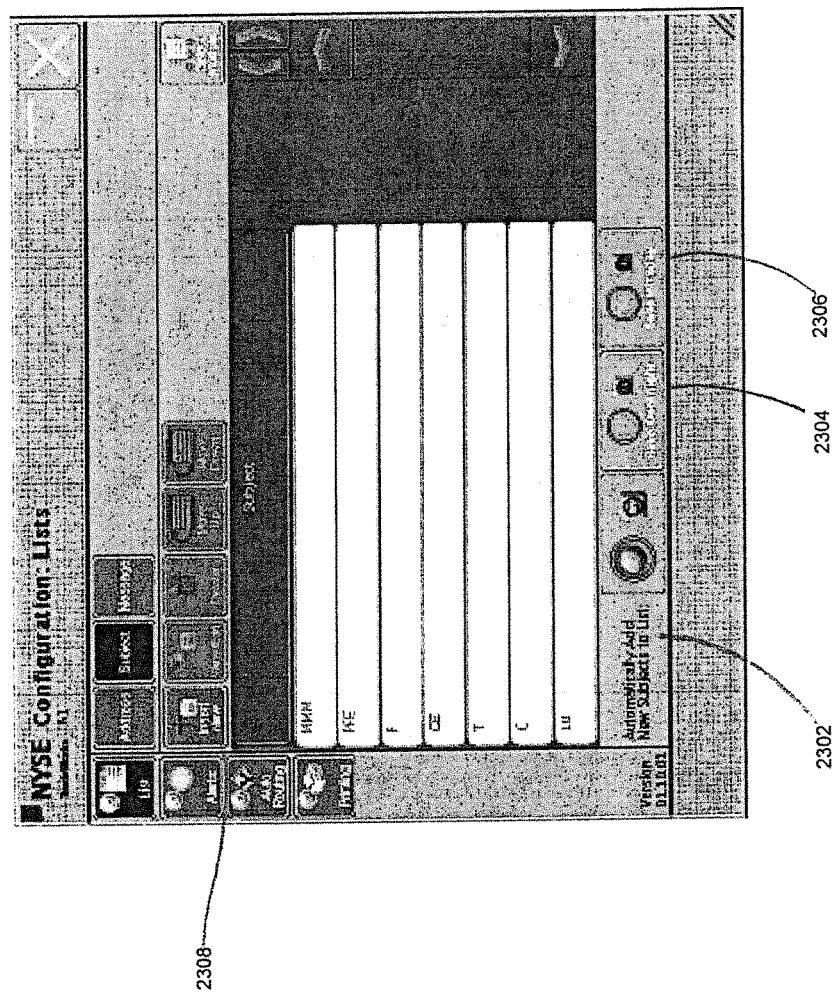
Figure 25:
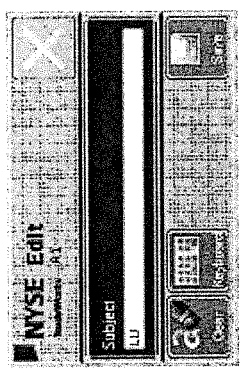

Similar to the way a user can add, edit and view addresses and groups, the user can also add, edit and view subjects, as illustrated in FIG. 23. One option is for subjects to be automatically added to the list 2302, and they can be saved overnight 2304 and intraday 2306. If the user selects the insert new button 2308, then an Insert New window opens, as illustrated in FIG. 24. Alternatively if the user selects a subject and the View/Edit button, an View/Edit window opens, as illustrated in FIG. 25.

Figure 26:
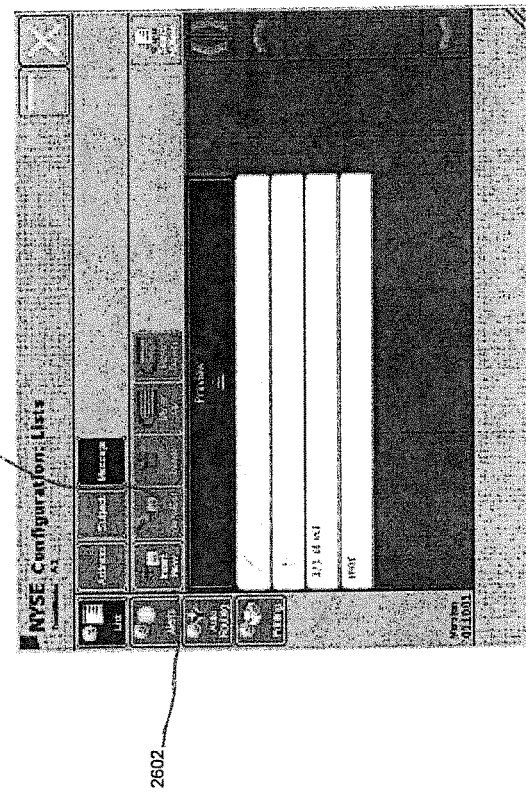
Figure 28:
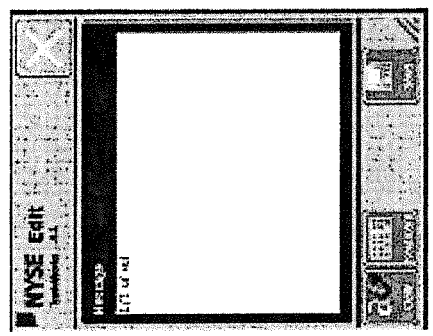
Figure 27:
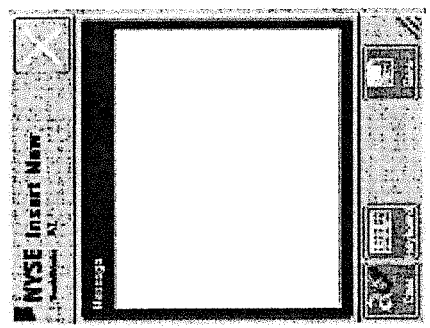

The user can also use the Configuration List window to add, modify or delete messages, as illustrated in FIG. 26. Pressing the insert New button 2602 will open an Insert New Message window, as illustrated in FIG. 27, while pressing the View/Edit button 2604 will open a message View/Edit window, as illustrated in FIG. 28. Messages can contain text or ink.

The user can also configure auto routing using the Auto Routing configuration button 2902. This includes a rule status (active or not), the address, the rule name, the room, post, panel or stock covered, and the date and time of the last modification as well as the user who last modified the rule.

Figure 29:
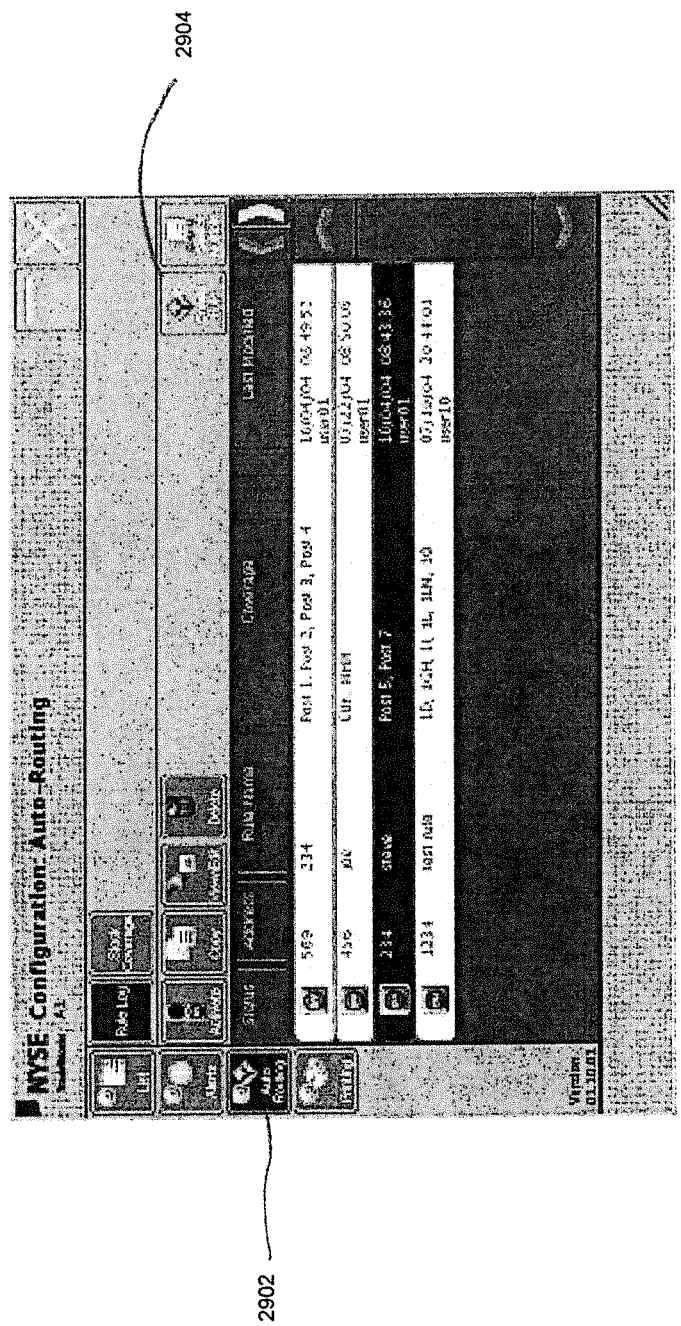
Figure 30:
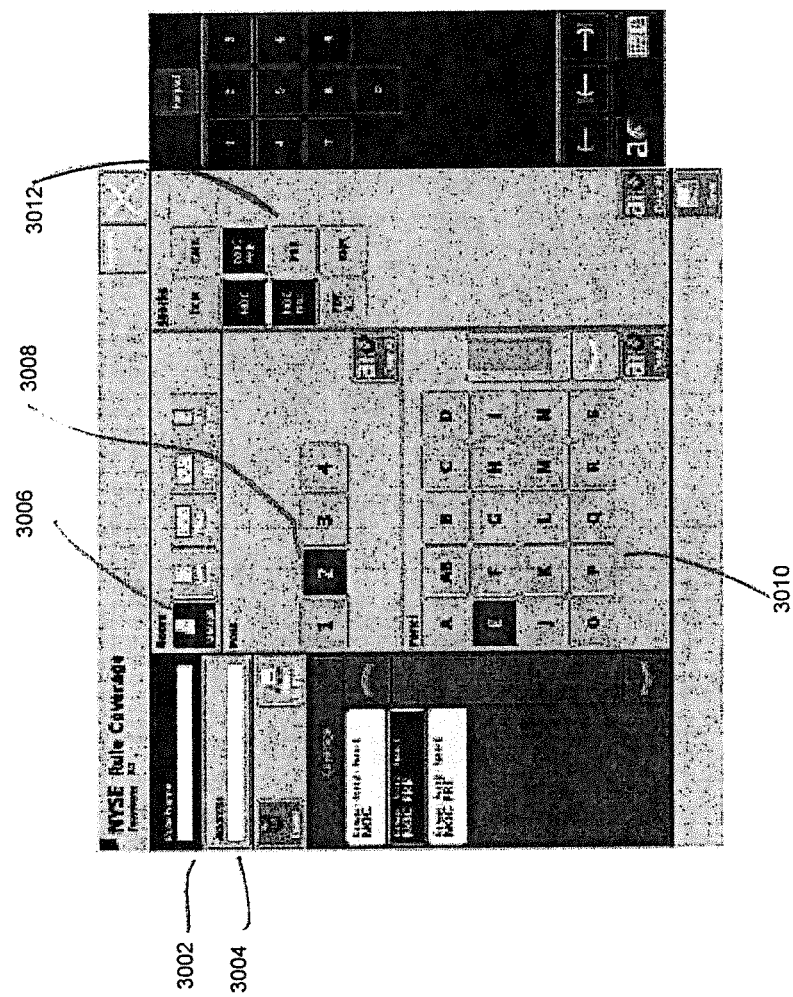

To insert a new rule, the user selects the create rule button (e.g., 2094 in FIG. 29), which opens a New Rule window, as illustrated in FIG. 30. The user enters a rule name 3002, and an address 3004. The user can also select a room 3006, post 3008, and panel 3010, as well as a specific stock 3012. As the user makes each selection, only the next available options are shown.

Figure 31:
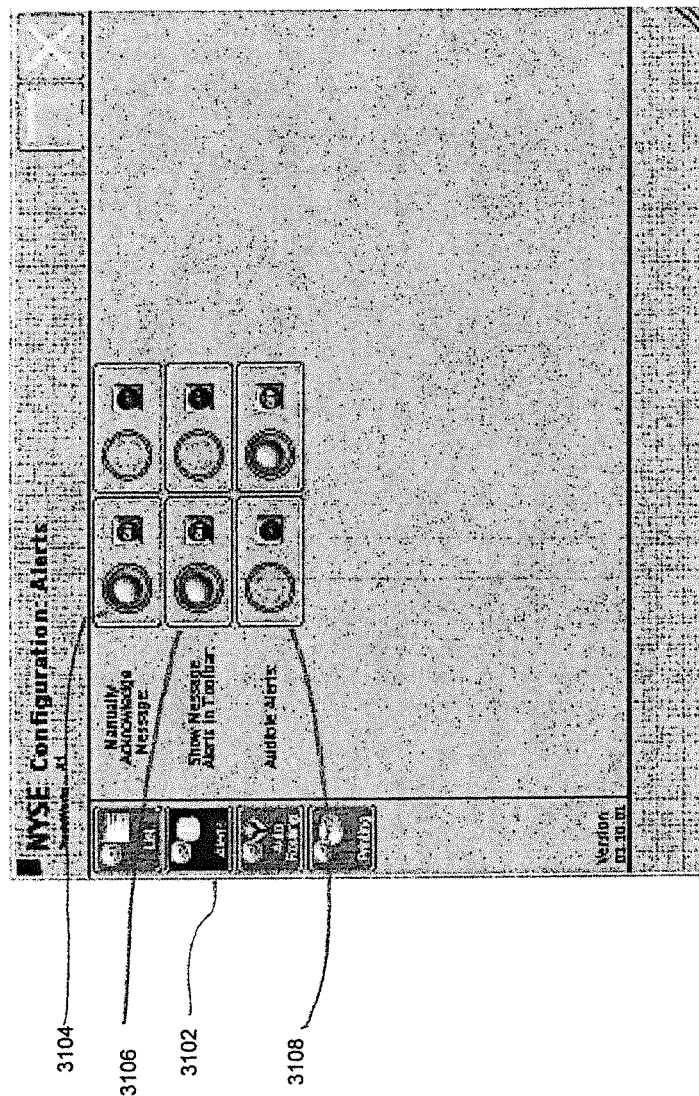

To configure alerts, the user selects the alerts button (e.g., 3102 in FIG. 31). Alerts include on/off options for: manually acknowledge messages 3104; show message alerts in toolbar 3106; and audible alerts 3108.

Figure 32:
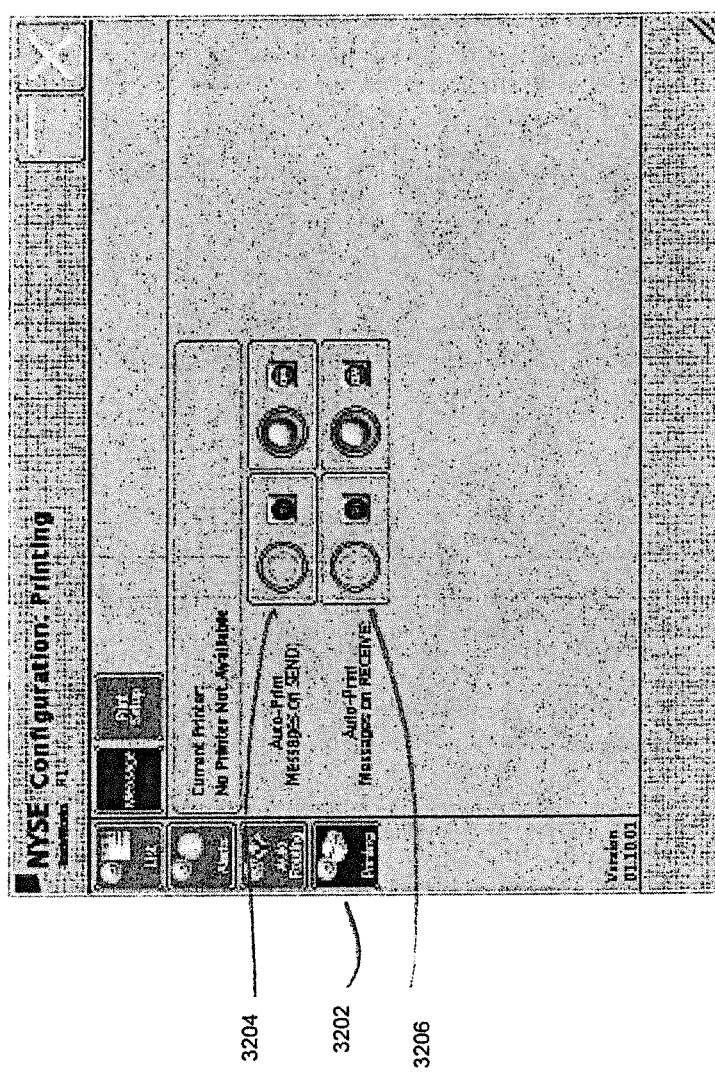
Figure 33:
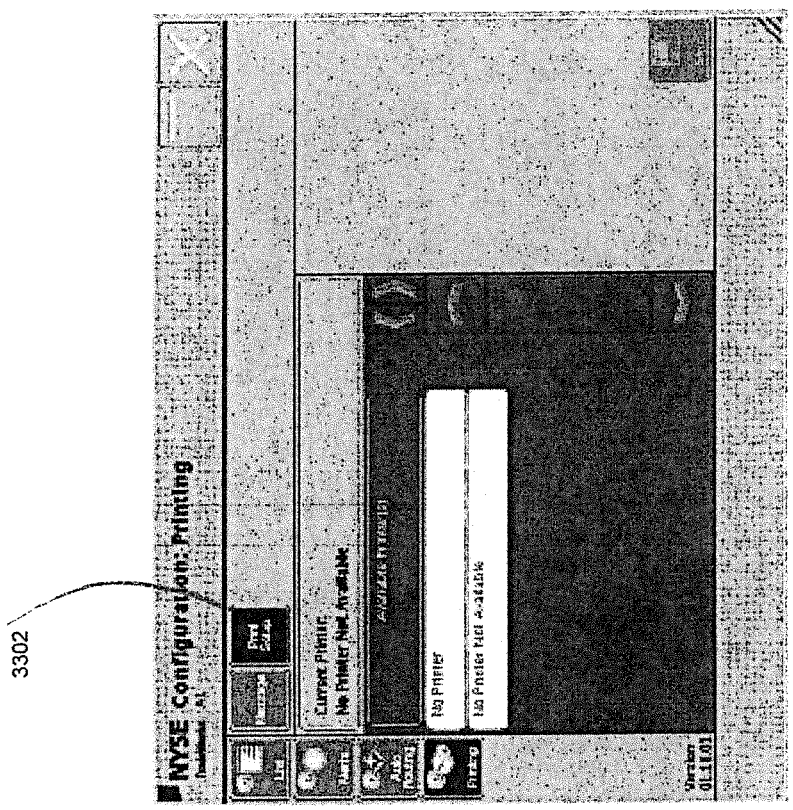

To configure printing, the user selects the print button (e.g., 3202 in FIG. 32). Print options include on/off options for: auto-print messages on send 3203; and auto-print messages on receive 3206. The user can also configure a particular printer using the print setup button 3302 in FIG. 33.

Figure 35:
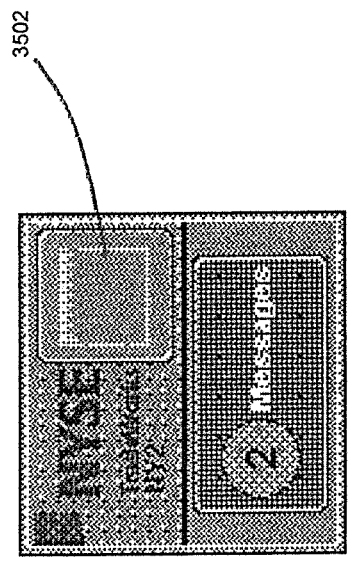
Figure 34:
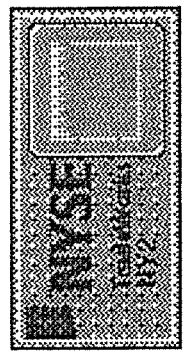

The toolbar illustrated in FIG. 3 is maximized. The user can minimize the toolbar by selecting the minimize button 320, which will cause the toolbar to appear as in FIG. 34. While the toolbar is minimized, if new unviewed messages arrive, the message indicator will be as in FIG. 35. Pressing the maximize button 3502, will restore the toolbar to the view as in FIG. 3.

Example Methods

Figure 37:
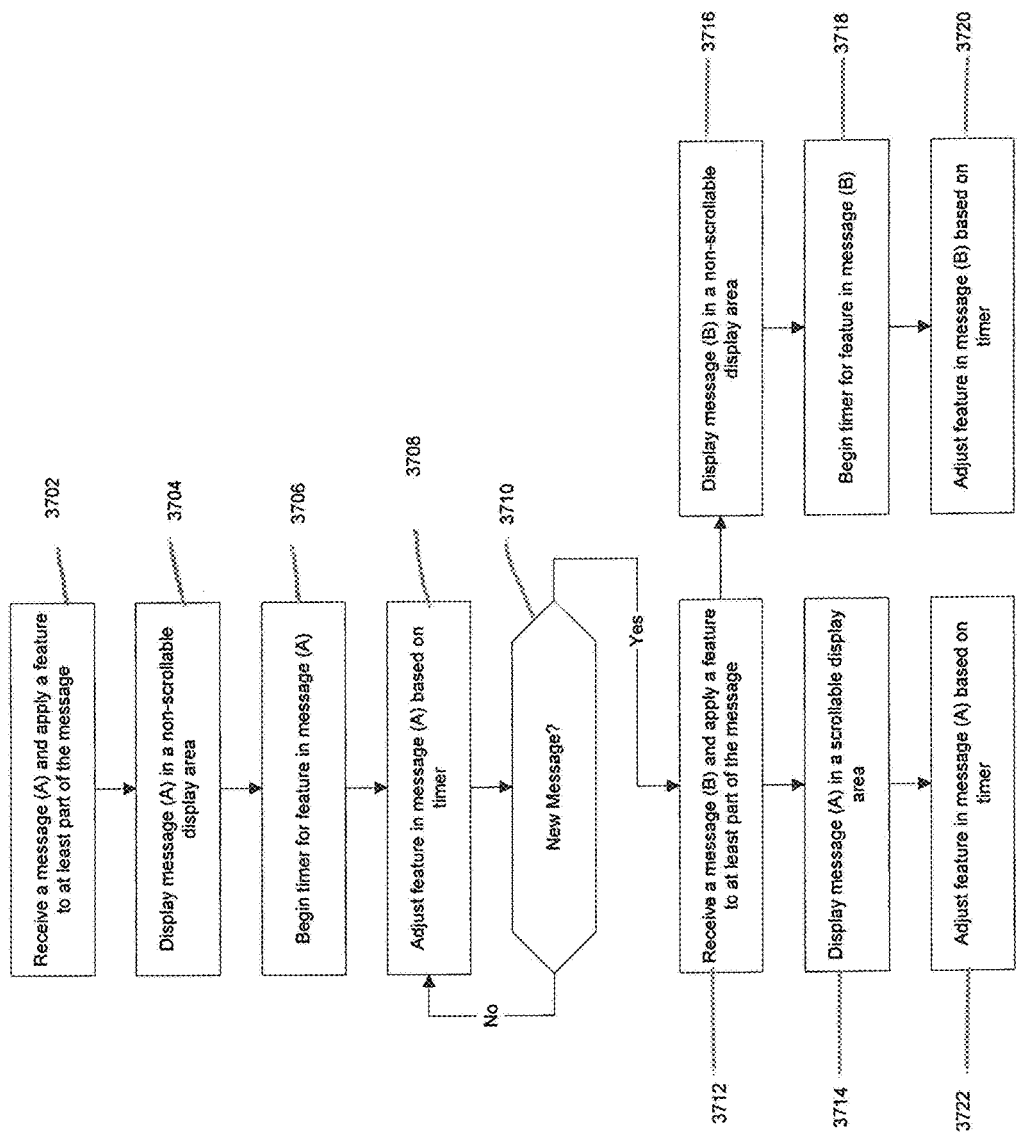
FIGS. 37-38 illustrate steps in methods according to various embodiments.

Referring to FIG. 37, an example method begins at step 3702 with system 100 receiving a message (A). Upon receipt of the message, system 100 applies at least one feature to the message. As examples, the features may include the color of the message background, and the color of the message border. In one embodiment, if the message has not been viewed, the background and border features are bright orange.

At step 3704, system 100 displays message (A) in a non-scrollable area of the display. An example embodiment of such a non-scrollable area is illustrated at 808 in FIG. 8.

At step 3706, system 100 begins a timer for the feature, or timers for the features, and at step 3708, system 100 adjusts the feature or features depending on the timer and possibly other factors.

At step 3710, system 100 determines whether a new message has been received, and if not, loops to step 3708.

If at step 3710, system 100 determines that a new message is received, then at step 3712, system 100 receives the new message (B) and applies a feature or features to at least part of message (B). In one example the feature is a colored background and/or colored border.

Then, at step 3714, system 100 displays message (A) in a scrollable area of the display. An example embodiment of such a scrollable area is illustrated at 806 in FIG. 8. At the same time, at step 3716, system 100 displays message (B) in the non-scrollable area of the display. In this way, message (B), which is a newer message, replaces message (A) in the non-scrollable area of the display, and at step 3714 older message (A) is now displayed in the scrollable display area.

At step 3718 system 100 begins a timer or timers for the feature or features of message (B), and at steps 3720 and 3722, system 100 adjusts the features of messages (B) and (A) respectively depending on the timers and possibly other factors.

Figure 38:
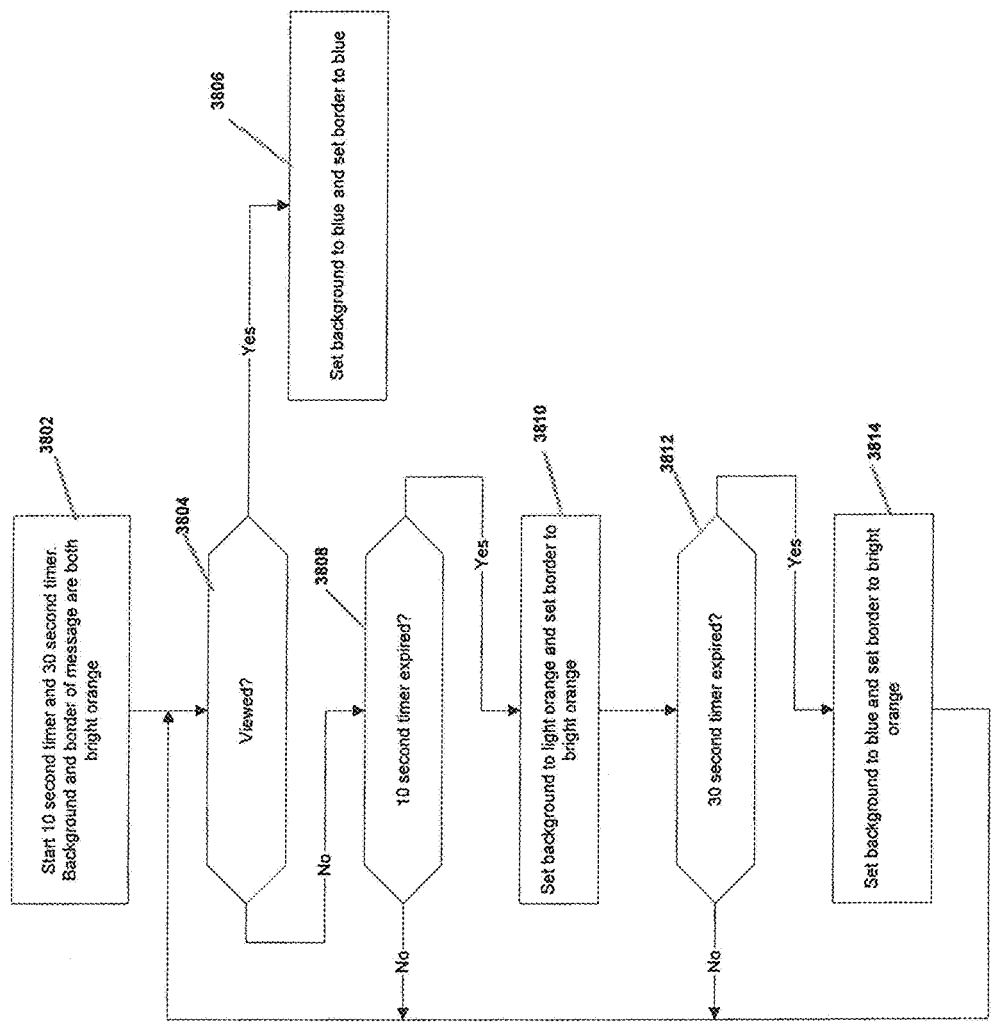

Some of the steps for adjusting features in FIG. 37 are further illustrated in FIG. 38. At step 3802, system 100 starts two timers for the message. In one example embodiment, one timer is a 10 second timer and the other is a 30 second timer. When the timers start, the displayed background and border of the message are both bright orange.

At step 3804, system 100 determines whether the user has viewed the message, and if so, at step 3806 system 100 sets the message background to blue and the message border to blue.

If system 100 determines that the message has not been viewed, then at step 3808, system 100 determines whether the 10 second timer has expired. If the 10 second timer has not expired, system 100 loops to step 3804.

If the 10 second timer has expired, then at step 3810, system 100 sets the message background to light orange and the message border to bright orange.

Then at step 3812, system 100 determines whether the 30 second timer has expired. If the 30 second timer has not expired, system 100 loops to step 3804.

If the 30 second timer has expired, then at step 3814, system 100 sets the message background to blue and the message border to bright orange, and then loops to step 3804.

Although illustrative embodiments have been described herein in detail, it should be noted and will be appreciated by those skilled in the art that numerous variations may be made within the scope of this invention without departing from the principle of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. A programmed computer comprising:
a message screen display;
a non-transitory memory storing computer readable code; and
a processor coupled to the non-transitory memory, the processor executing the computer readable instructions which causes the message screen display to generate and display:
a message subject fly-out window on the message screen display that includes user configurable and user selectable message subject text templates;
a message recipient fly-out window on the message screen display that includes user configurable and user selectable message recipient text templates; and
a message body fly-out window on the message screen display comprising user configurable and user selectable message body ink templates,
the message body ink templates comprising hand-written information contained within images,
said hand-written information prepared by a user prior to selection on the programmed computer,
said hand-written information being particular to the user, and
said hand-written information stored on the programmed computer such that the hand-written information is selectable through the message body fly-out window and is displayed on a message field of the message screen display after having been selected, the displayed selected hand-written information being in a condition to be sent, the displayed selected hand-written information being editable directly within said message field with additional hand-written information that is particular to the user.

2. The programmed computer of claim 1, wherein the message subject text templates are selected on the message subject fly-out window.

3. The programmed computer of claim 1, wherein a message subject is entered in a subject field of the message screen display using an on-screen keyboard.

4. The programmed computer of claim 1, wherein the message recipient text templates are selected on the message recipient fly-out window.

5. The programmed computer of claim 1, wherein a message recipient is entered in a To field of the message screen display using an on-screen keyboard.

6. The programmed computer of claim 1, further comprising message body text templates that are selectable from the message body fly-out window.

7. The programmed computer of claim 6, wherein a message body comprising text is entered in the message field of the message screen display using an on-screen keyboard.

8. The programmed computer of claim 7, further comprising one or more buttons configured to insert one or more pages before or one or more pages after the message field of the message screen display.

9. The programmed computer of claim 1, further comprising one or more tab buttons for moving sequentially among fields on the message screen display.

* * * * *